United States Patent
MacMahon et al.

(10) Patent No.: US 10,968,794 B2
(45) Date of Patent: Apr. 6, 2021

(54) ENGINE TRANSPORTATION APPARATUS

(71) Applicant: General Electric Company, Schenectady, NY (US)

(72) Inventors: Carl Lawrence MacMahon, Cincinnati, OH (US); James Eugene Dingle, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/712,345

(22) Filed: Dec. 12, 2019

(65) Prior Publication Data

US 2020/0116054 A1  Apr. 16, 2020

Related U.S. Application Data

(63) Continuation of application No. 15/642,483, filed on Jul. 6, 2017, now Pat. No. 10,539,053.

(51) Int. Cl.
| | |
|---|---|
| *B64F 5/50* | (2017.01) |
| *F01D 25/28* | (2006.01) |
| *F16N 7/00* | (2006.01) |
| *B64F 5/10* | (2017.01) |
| *F01M 11/06* | (2006.01) |

(52) U.S. Cl.
CPC ............ *F01M 11/064* (2013.01); *B64F 5/50* (2017.01); *F01D 25/28* (2013.01); *F16N 7/00* (2013.01); *B64F 5/10* (2017.01); *F05D 2230/00* (2013.01); *F05D 2230/68* (2013.01); *F05D 2260/98* (2013.01); *F16N 2210/02* (2013.01)

(58) Field of Classification Search
CPC . B64F 5/50; B64F 5/10; F01M 11/064; F05D 2260/98
See application file for complete search history.

(56) References Cited

U.S. PATENT DOCUMENTS

| | | | | |
|---|---|---|---|---|
| 2,610,466 A | * | 9/1952 | Ballantyne | F02C 7/26 60/790 |
| 2,776,537 A | * | 1/1957 | Peterson | F02C 7/22 60/39.15 |
| 2,938,338 A | * | 5/1960 | Flanigan | F02C 7/26 60/790 |
| 3,570,250 A | * | 3/1971 | Pensel | F02K 7/00 60/263 |
| 3,954,611 A | | 5/1976 | Reedy | |
| 4,724,875 A | | 2/1988 | Baldwin et al. | |
| 5,319,920 A | | 6/1994 | Taylor | |
| 5,383,652 A | * | 1/1995 | Van Den Berg | B25H 1/0007 269/17 |
| 5,575,607 A | * | 11/1996 | Grout | B66C 19/00 414/589 |
| 5,722,512 A | * | 3/1998 | Lilja | B64F 5/50 187/244 |

(Continued)

*Primary Examiner* — Michael R Mansen
*Assistant Examiner* — Mark K Buse
(74) *Attorney, Agent, or Firm* — Michele V. Frank; Venable LLP

(57) ABSTRACT

An apparatus for transporting a turbine engine with a transportation fixture including a turbine engine jig having mounts for securing the turbine engine, a rotor with a drive shaft rotationally supported by a bearing, the method includes supplying a lubricant to the bearing and rotating the drive shaft while the turbine engine is in transport.

20 Claims, 4 Drawing Sheets

(56) References Cited

U.S. PATENT DOCUMENTS

| | | | |
|---|---|---|---|
| 6,170,141 B1* | 1/2001 | Rossway | F01D 25/285 206/319 |
| 6,296,028 B1 | 10/2001 | Oakland | |
| 7,662,059 B2* | 2/2010 | McCune | F01D 25/20 475/159 |
| 7,861,827 B2 | 1/2011 | Madge et al. | |
| 8,511,986 B2 | 8/2013 | Alvanos et al. | |
| 8,590,151 B2 | 11/2013 | Brown et al. | |
| 8,672,606 B2 | 3/2014 | Glynn et al. | |
| 8,746,404 B2 | 6/2014 | Allam | |
| 9,745,897 B2* | 8/2017 | Francisco | F02C 7/268 |
| 10,040,579 B1 | 8/2018 | Henderson | B64F 5/50 |
| 10,161,408 B2* | 12/2018 | Mastro | F04D 25/045 |
| 10,196,926 B2* | 2/2019 | Ketchum | F01D 25/20 |
| 2009/0266275 A1* | 10/2009 | Feeney | B64F 5/50 108/55.1 |
| 2009/0294625 A1* | 12/2009 | Fernley | F16M 1/04 248/671 |
| 2012/0091265 A1* | 4/2012 | Stretton | B64D 27/12 244/54 |
| 2013/0098059 A1* | 4/2013 | Suciu | F01D 15/08 60/783 |
| 2013/0174761 A1* | 7/2013 | Warton | F01D 25/285 108/25 |
| 2015/0292359 A1* | 10/2015 | Ketchum | F02C 7/06 415/1 |
| 2016/0334303 A1* | 11/2016 | Thomson | G01M 13/045 |
| 2016/0376988 A1* | 12/2016 | Sheridan | F02K 3/00 60/39.08 |
| 2017/0107858 A1* | 4/2017 | Murphy | F01D 25/24 |
| 2017/0122330 A1* | 5/2017 | Mastro | F04D 29/325 |
| 2017/0145920 A1* | 5/2017 | Schwarz | F02C 7/06 |
| 2017/0166331 A1* | 6/2017 | Kohn | B62B 3/04 |
| 2017/0175874 A1* | 6/2017 | Schwarz | F01D 21/00 |
| 2017/0191381 A1* | 7/2017 | Baba | F01D 25/285 |
| 2017/0297744 A1* | 10/2017 | Drieu | B05C 13/02 |
| 2018/0142576 A1* | 5/2018 | Dervaux | F01D 25/285 |
| 2018/0334267 A1* | 11/2018 | Bailey | B64F 5/50 |
| 2019/0010841 A1* | 1/2019 | MacMahon | F01D 25/28 |
| 2019/0292944 A1* | 9/2019 | Mason | F01D 21/14 |

* cited by examiner

ENGINE TRANSPORTATION APPARATUS

CROSS REFERENCE TO RELATED APPLICATION

This application is a continuation of U.S. patent application Ser. No. 15/642,483 filed Jul. 6, 2017, now U.S. Pat. No. 10,539,053, issued Jan. 21, 2020, which is incorporated herein in its entirety.

BACKGROUND OF THE INVENTION

Turbine engines, and particularly gas or combustion turbine engines, are rotary engines that extract energy from a flow of combusted gases passing through the engine onto a multitude of rotating turbine blades, which are mounted to a rotating shaft rotationally supported by bearings. Turbine engines transported from a manufacturing facility by an automotive vehicle, such as a semi-tractor, require a transportation process that avoids damage to the turbine engine bearings. The bearings can be damaged by the relatively high frequency vibrations during movement over roads, which can cause false brinelling and wash boarding failures. Typically, air ride shocks and rubber isolators are used during transportation to isolate the engine and bearings from the vibrations from the vehicle to thereby prevent damage to the bearings from vibration.

BRIEF DESCRIPTION OF THE INVENTION

In one aspect, the present disclosure relates to a turbine engine transportation fixture comprising a turbine engine jig having mounts for securing a turbine engine; a rotary driver having a power take off configured to couple to an input on the turbine engine; and a lubricant reservoir configured to couple with a fluid coupling for a bearing coolant circuit for the turbine engine.

DETAILED DESCRIPTION OF THE INVENTION

Figure 1:
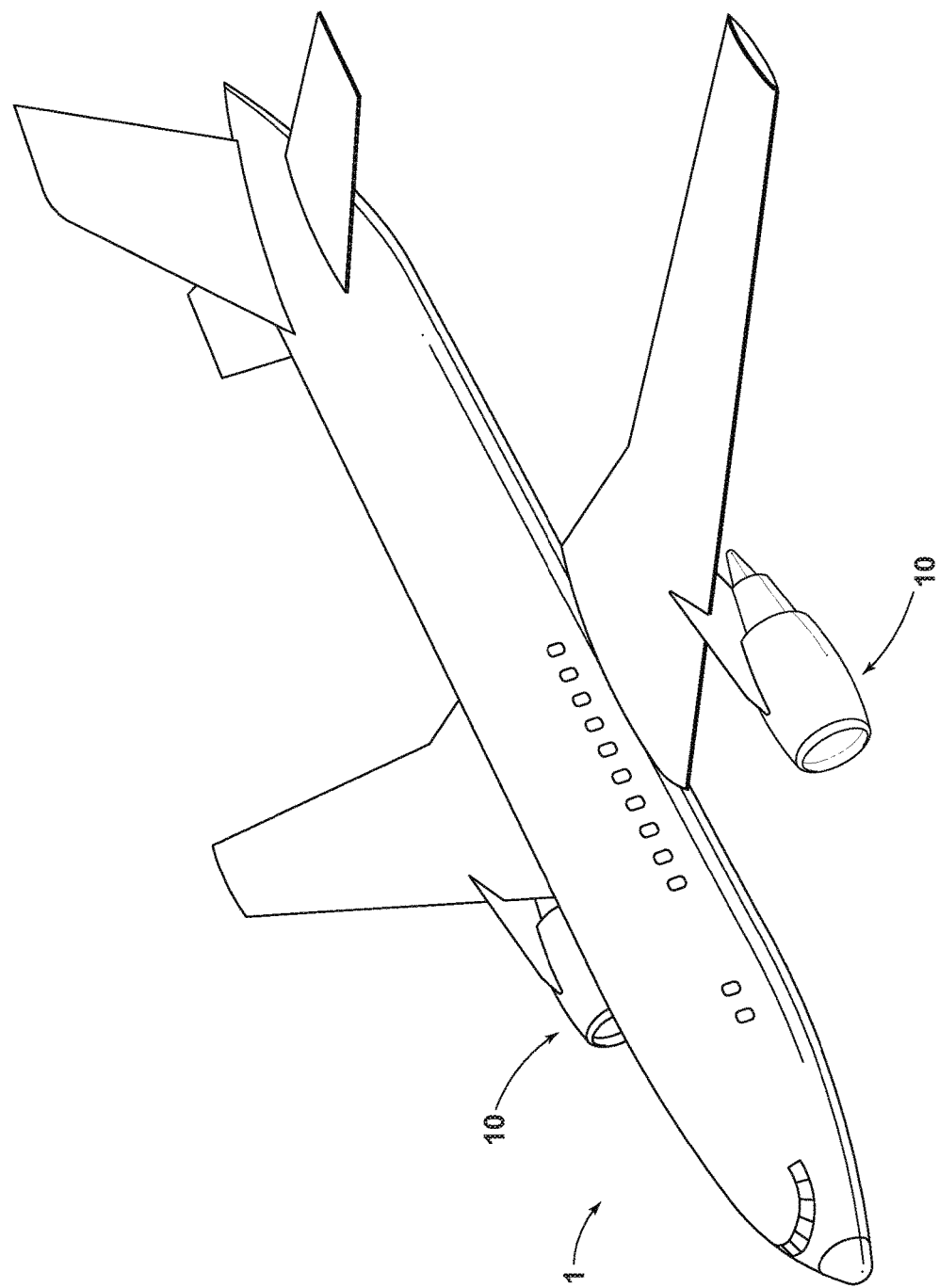
FIG. 1 is a perspective view of an aircraft having gas turbine engines.

Aspects of the disclosure described herein are directed to a transport for and transportation of a turbine engine where a rotor of the turbine engine is rotated while lubricant is supplied to a bearing rotationally supporting a drive shaft of the rotor while the drive shaft is spaced from the bearing by a film of lubricant. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 schematically illustrates an aircraft 1 having turbine engines 10 enclosed within a nacelle and attached to the wings of the aircraft 1. The engines 10 are typically transported to the assembly or maintenance facility for the aircraft, where the engines 10 can be mounted to the aircraft 1.

Figure 2:
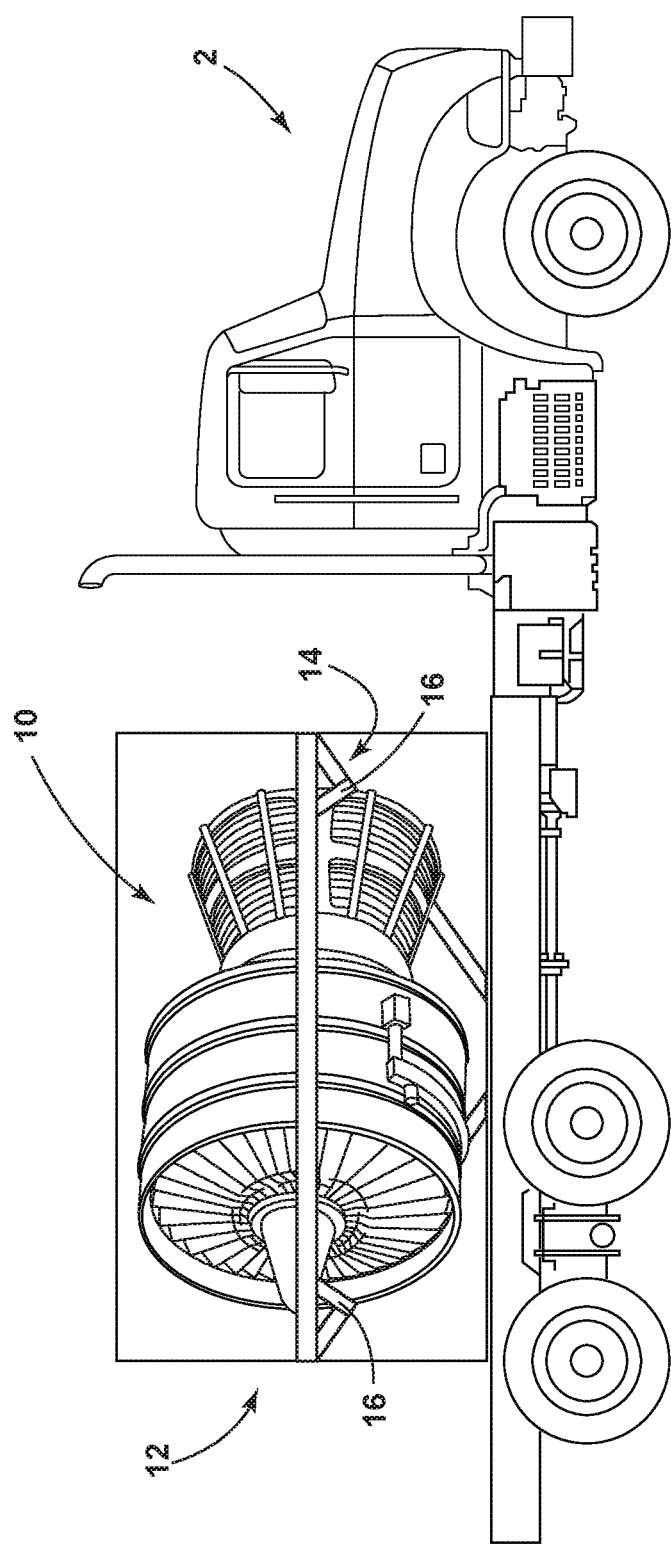
FIG. 2 is a schematic view of a gas turbine engine during transportation in accordance with various aspects described herein.

FIG. 2 schematically depicts a suitable transport vehicle, such as a semi-trailer truck 2 having a transportation fixture 12 for transporting the turbine engine 10, shown without the nacelle. The transportation fixture 12 can include a turbine engine jig 14 for securing the turbine engine 10. The turbine engine jig 14 can include mounts 16, which can be in the form of wing mounts 16, which are similar to those used to mount the engine to the aircraft 1, to further secure the turbine engine 10. For purposes of this description, the type of transport vehicle and the specific structure of the jig are not germane. Any suitable or desired transport vehicle or jig can be used. It is contemplated that the vehicle and jig will permit the rotation of the turbine engine 10 during transportation.

Figure 3:
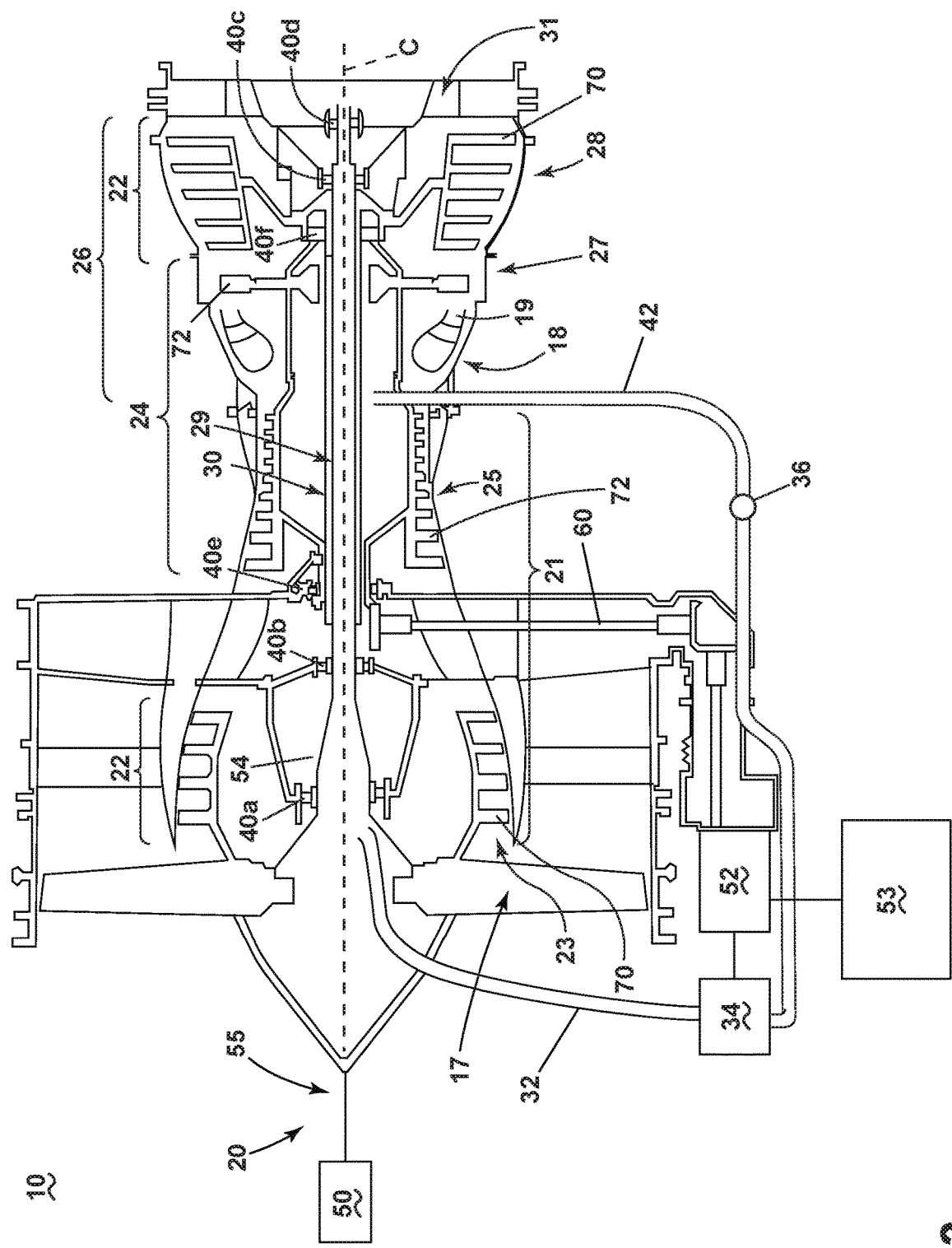
FIG. 3 is a schematic cross-sectional diagram of a gas turbine engine in accordance with various aspects described herein.

FIG. 3 illustrates a schematic cross-sectional diagram of a turbine engine 10 in accordance with various aspects described herein. The turbine engine 10 can include in axially flow arrangement a fan section having a fan 17, a compressor section 21 including a low pressure (LP) compressor 23 and a high pressure (HP) compressor 25, a combustion section 18 including a combustor 19, a turbine section 26 including a HP turbine 27, and a LP turbine 28, and an exhaust section 31. The low pressure compressor 23 and low pressure turbine 28 have rotating components, such as blades 70, which are driven by a common low pressure drive shaft 29 to form a low pressure (LP) spool 22, with the low pressure drive shaft 29 also driving the fan 17 via a fan aft shaft 54. Similarly, the high pressure compressor 25 and high pressure turbine 27 have rotating components, such as blades 72, which are driven by a high pressure drive shaft 30 to define a high pressure (HP) spool 24. The high pressure drive shaft 30 is hollow and the low pressure shaft 29 passes through the high pressure drive shaft 30, such that they both rotate about the same rotational axis, which in most cases defines a longitudinal axis or centerline C for the turbine engine.

The rotating components of the turbine engine, such as the low pressure spool 22 and high pressure spool 24 collectively form a rotor 20 for the turbine engine 10. While both a low pressure spool 22 and high pressure spool 24 are described, the turbine engine 10 can have a simpler configuration with only a single spool, or have a more complicated structure with more than two spools.

The low pressure drive shaft 29 and the high pressure drive shaft 30 each are rotationally supported by one or more bearings 40 such as axially-spaced bearings 40a, 40b, 40c, 40d, 40e, and 40f that can support the low pressure spool 22 and the high pressure spool 24. The bearings will be referred to generically with the numeral 40 and a specific bearing will be referred to using the appropriate suffix a-f. Bearings 40a, 40b, 40c, and 40d can support the low pressure spool 22, while bearings 40e and 40f can support the high pressure spool 24. The bearings 40 can be any suitable bearings such as roller bearings or ball bearings.

To turn the rotor during transportation, given that the turbine engine is not capable of running, a lubricant system for the bearings is provided as well as a rotary device for rotating the rotor. The lubricant system includes a lubricant reservoir 34 can be located external of the engine 10 and can be configured to supply lubricant to the bearings 40 via a lubricant recirculation circuit comprising a supply circuit 32 and a return circuit 42. At least a portion of the lubricant recirculation circuit can include portions of the lubricant supply circuit 32 already provided in the turbine engine 10 for lubricating the bearings 40 under normal operation. A recirculation pump 36 is fluidly coupled to the recirculation circuit to supply lubricant from the reservoir 34 to the bearing 40 via the supply circuit and can return the supplied lubricant to the reservoir via the return circuit 42.

One or more rotary devices, or rotary drivers, are provided for rotating the rotor 20 during transportation, without running the turbine engine. The rotary drivers can directly or indirectly rotate one or both of the low and high pressure drive shafts 29, 30. For example, a rotary driver in the form of an electric motor 53 is provided to indirectly rotate the drive shafts 29, 30 using an accessory gearbox 52. Alternatively, an electric motor 50 can be mechanically coupled to the fan aft shaft 54 or it can be frictionally coupled to the fan aft shaft 54 via a friction driver 55. Rotation of the fan aft shaft 54 can effect a rotation of the low pressure drive shaft 29. Furthermore, either electric motor 50, 53 can be configured to receive power from the transport vehicle 2. Alternatively, the electric motor 53 can receive power from any other suitable power source, such as a battery.

If the rotary driver is a mechanical driver, the rotary driver can be coupled to a power take off from the transport vehicle 2 that is configured to couple to an input of the turbine engine 10, such as the accessory gearbox 52.

Figure 4:
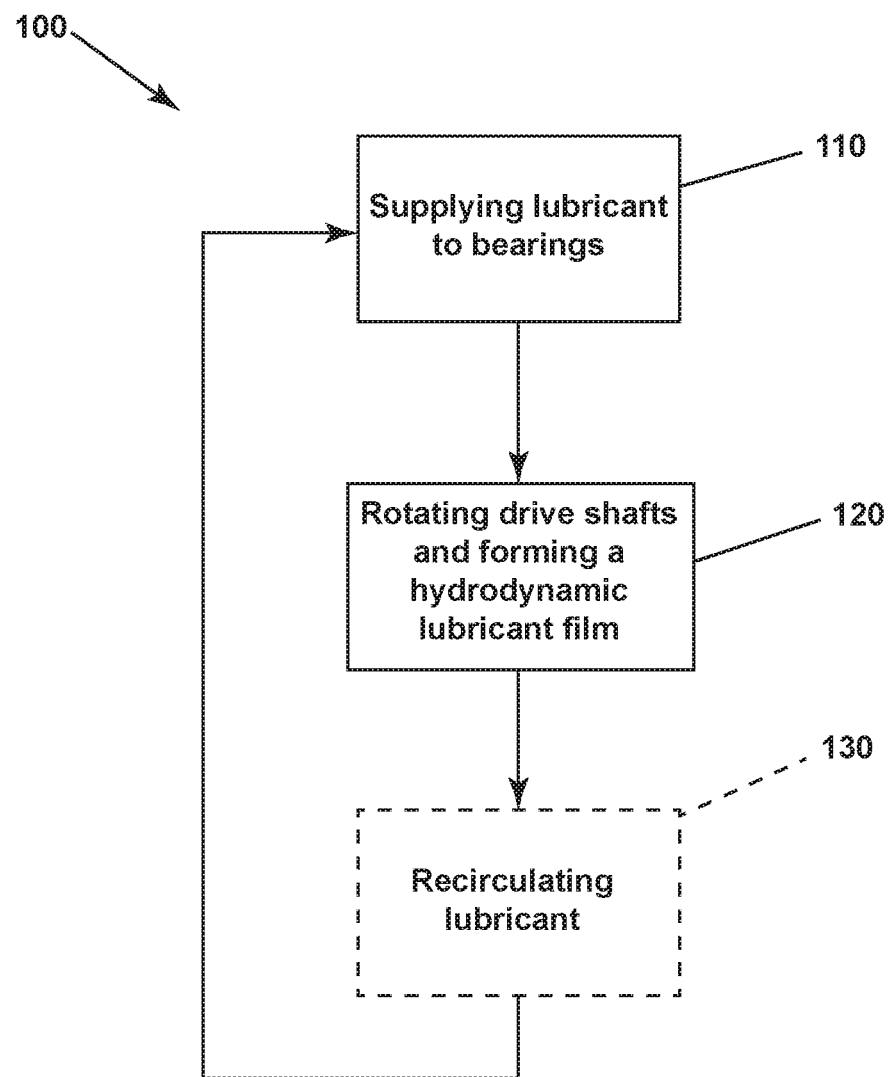
FIG. 4 is a flow chart of a method of transportation of a turbine engine according to various aspects described herein.

A method 100 of transporting the turbine engine 10 is illustrated in FIG. 4. At step 110 lubricant is supplied to one or more of the bearings 40. Then, at step 120 one or both of the low and high pressure drive shafts 29, 30 are rotated at a speed such that a consistent hydrodynamic lubricant film forms between the drive shafts 29, 30 and the bearings 40 so that the hydrodynamic lubricant film supports the drive shafts 29, 30 physically above the bearing. While steps 110 and 120 are shown as two steps, it is within the scope of aspects described herein for steps 110 and 120 to occur simultaneously. The term hydrodynamic lubricant film is used herein to describe the condition where the drive shafts 29, 30 ride on a film of lubricant between the drive shafts 29, 30 and the bearing 40 without the drive shafts 29, 30 physically contacting the surface of the bearing 40. To accomplish the formation of a hydrodynamic lubricant film between the bearing 40 and the drive shafts 29, 30, the drive shafts 29, 30 can be rotated at a predetermined speed or within a predetermined speed range where the hydrodynamic lubricant film will form for the expected lubricant under the expected conditions. The predetermined speed can be, for example, at least 200 rpm. The predetermined speed range required speed to develop an effective lubricant film is determined by the lubricant material properties, bearing 40 geometry, operating temperature and rotating speed. An effective lubricant film is achieved when the viscosity ratio, ratio of kinematic viscosity to the reference viscosity, is greater than one. The reference viscosity is a function of the bearing 40, operating temperature(s) and rotational speed.

The lubricant can be supplied from the lubricant reservoir 34, which can be located external to the turbine engine 10. Optionally, at step 130, the lubricant can be recirculated and supplying the lubricant can include recirculating the lubricant. Specifically the lubricant can be recirculated between the bearing 40 and the lubricant reservoir 34. Types of lubricant can include but are not limited to petroleum based oils or synthetic oils such as silicon, diesters, PAO's, and fluorinated compounds. Typical gas turbine engine oils of the 5 cSt variety that meet MIL-PRF-23699 requirements can also be suitable. The lubricant is supplied at a rate suitable to form the hydrodynamic lubricant film. Suitable supply rates are dependent on the bearing 40 geometry, delivery method, and pressure if the lubricant recirculation circuit contains pressurized lubricant or oil. Typical gas turbine engines 10 spray lubricant onto the bearing 40, or supply lubricant under a bearing 40 race so pressure does not add to the lubricant film thickness. Motion of the rotating elements, such as the rotor, pushing the lubricant provides an effective pressure to develop the hydrodynamic film. The film necessary to separate the bearing 40 rolling and sliding elements is affected by the surface finish of the abutting components. Rates of lubricant supply will vary by bearing 40 size and the number of bearings 40, as well as the scavenge capacity of the lubricant to remove or de-activate impurities. Turboshaft engines will require much less supply than a large Turbofan engine. A medium size turbofan engine 10 can require 1-2 liters per minute of lubricant supply. The lubricant supply rate and the drive shaft 29, 30 rotational speed can both vary due to factors such as lubricant type, lubricant temperature, or the weight or pressure that is supported by the bearings 40. For example, lubricant at higher temperatures can be supplied at a slower rate. Moreover, the drive shaft 29, 30 rotational speed can be lower than the predetermined speed for lubricant of a lower temperature. Advantageously, the rotation of the drive shafts 29, 30 can be carried out without the running of the engine. In many cases, the lowest rotational speed needed to form the hydrodynamic lubricant film will be less than the idle speed of the engine.

The method can further include rotating the drive shafts 29, 30, using the electric motor 53 driving the accessory gearbox 52. Alternatively, or in combination, the drive shafts 29, 30 can be rotated by rotating the fan aft shaft 54, which can be driven by the electric motor 50 or the friction driver 55. Since the drive shafts 29, 30 can be rotated using the electric motor 53 or the electric motor 50, combustion of the turbine engine 10 is not required. Therefore, rotating the drive shafts 29, 30 can occur without combustion of the turbine engine 10, or in other words the drive shafts 29, 30 can be rotated independently of engine combustion.

It should be appreciated that application of the disclosed design is not limited to turbine engines with fan and booster sections, but is applicable to turbojets and turbo engines as well. Benefits of aspects described herein can include improved cushioning for bearings in a turbine engine in order to protect the bearings from vibratory damage during transportation, for example. The cushioning is a result of developing a lubricant film, or oil film while the bearings are rotated, without combustion of the turbine engine, which allows the bearings to withstand higher vibrations to avoid potential false brinelling and washboard failures.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine transportation fixture comprising:
   a turbine engine jig having mounts for securing a turbine engine;
   a rotary driver configured to couple to an input on the turbine engine for continuously rotating a rotor of the turbine engine independently of engine combustion; and
   a lubricant reservoir configured to couple with a bearing coolant circuit for the turbine engine.

2. The turbine engine transportation fixture of claim 1, wherein at least one of the mounts is a wing mount.

3. The turbine engine transportation fixture of claim 1, wherein the rotary driver is a friction driver configured to couple to a fan aft shaft of the turbine engine.

4. The turbine engine transportation fixture of claim 1, wherein the rotary driver is a motor.

5. The turbine engine transportation fixture of claim 4, wherein the motor is configured to directly or indirectly couple to a fan aft shaft of the turbine engine.

6. The turbine engine transportation fixture of claim 4, wherein the motor is configured to directly or indirectly couple to an accessory gearbox of the turbine engine.

7. The turbine engine transportation fixture of claim 4, wherein the motor is an electric motor.

8. The turbine engine transportation fixture of claim 7, wherein the electric motor is configured to receive power from a transport vehicle.

9. The turbine engine transportation fixture of claim 7, wherein the electric motor is configured to receive power from a battery.

10. The turbine engine transportation fixture of claim 1, wherein the lubricant reservoir comprises a recirculation pump.

11. The turbine engine transportation fixture of claim 1, wherein the turbine engine comprises at least one drive shaft rotationally supported by at least one bearing and the at least one drive shaft is coupled to the input such that the at least one drive shaft rides on a film of lubricant between the at least one drive shaft and the bearing without the at least one drive shaft physically contacting the bearing.

12. The turbine engine transportation fixture of claim 11, wherein the input is an accessory gearbox rotatably coupled to the at least one drive shaft.

13. The turbine engine transportation fixture of claim 11, wherein the input is a fan aft shaft coupled to the at least one drive shaft.

14. The turbine engine transportation fixture of claim 13, wherein the fan aft shaft is mechanically coupled to the at least one drive shaft.

15. The turbine engine transportation fixture of claim 13, wherein the fan aft shaft is frictionally coupled to the at least one drive shaft.

16. The turbine engine transportation fixture of claim 11, wherein the bearing coolant circuit further comprises a supply circuit and a return circuit.

17. The turbine engine transportation fixture of claim 16, further comprising a recirculation pump fluidly coupled to the bearing coolant circuit to supply lubricant from the reservoir to the at least one bearing via the supply circuit and to return the supplied lubricant to the reservoir via the return circuit.

18. The turbine engine transportation fixture of claim 11, wherein the at least one drive shaft is a high pressure drive shaft and a low pressure drive shaft.

19. The turbine engine transportation fixture of claim 18, wherein the low pressure drive shaft and the high pressure drive shaft each are rotationally supported by axially-spaced bearings.

20. The turbine engine transportation fixture of claim 11, wherein the rotary driver is configured to rotate the at least one drive shaft at a predetermined speed.

* * * * *